United States Patent [19]
Fukutomi et al.

[11] Patent Number: 5,543,045
[45] Date of Patent: Aug. 6, 1996

[54] CHARGE MOSAIC MEMBRANE AND PRODUCTION PROCESS THEREOF

[75] Inventors: Takashi Fukutomi, Tokyo; Minoru Takizawa, Moriya-machi; Michiei Nakamura, Souka, all of Japan

[73] Assignee: Dainichiseika Color & Chemicals Mfg. Co., Ltd., Tokyo, Japan

[21] Appl. No.: 206,256

[22] Filed: Mar. 7, 1994

Related U.S. Application Data

[63] Continuation of Ser. No. 36,682, Mar. 25, 1993, abandoned.

[30] Foreign Application Priority Data

Sep. 25, 1992 [JP] Japan ................................... 4-279248
Mar. 11, 1993 [JP] Japan ................................... 5-076435

[51] Int. Cl.⁶ ...................................................... B01D 69/02
[52] U.S. Cl. .............. 210/490; 210/500.35; 210/500.42; 427/245

[58] Field of Search ................................. 210/500.28, 490, 210/638, 504, 506, 500.35, 500.42; 427/245; 264/41, 49

[56] References Cited

U.S. PATENT DOCUMENTS

| | | | |
|---|---|---|---|
| 3,073,735 | 1/1963 | Till et al. | 210/506 X |
| 3,158,532 | 11/1964 | Pall et al. | 210/504 X |
| 4,976,860 | 12/1990 | Takahashi et al. | 210/500.28 |
| 4,997,864 | 3/1991 | Waters | 523/319 |
| 5,135,627 | 8/1992 | Soane | 204/182.8 |
| 5,304,307 | 4/1994 | Linder et al. | 210/490 |

*Primary Examiner*—Frank Spear
*Attorney, Agent, or Firm*—Oblon, Spivak, McClelland, Maier & Neustadt, P.C.

[57] ABSTRACT

A charge mosaic membrane is made of a cationic polymer and an anionic polymer. At least one of the cationic and anionic polymers is in the form of spheres having a diameter of 0.01–10 μm. A process for the production of the charge mosaic membrane is also described.

8 Claims, 1 Drawing Sheet

5,543,045

CHARGE MOSAIC MEMBRANE AND PRODUCTION PROCESS THEREOF

This application is a continuation of application Ser. No. 08/036,682, filed on Mar. 25, 1993, now abandoned.

BACKGROUND OF THE INVENTION

1. Field of the Invention

This invention relates to a charge mosaic membrane, and more specifically to a charge mosaic membrane useful for the separation of an electrolyte or non-electrolyte or for desalination. This invention is also concerned with a process for the production of the charge mosaic membrane.

2. Description of the Related Art

Conventional charge mosaic membranes, in each of which a cationic polymer and an anionic polymer are alternately arranged, have the function that they can dialyze a low-molecular electrolyte therethrough but cannot dialyze a non-electrolyte. They are hence highly promising candidates for the desalination or desalting of seawater or the like and a variety of research has been conducted thereon.

Representative charge mosaic membranes include, for example, those produced by combining block copolymers A-C and B-C—which have been formed by block-copolymerizing mutually-incompatible polymers A and B with a third polymer C, respectively—at such a ratio as permitting the formation of a lamellar or cylindrical structure, followed by the introduction of anionic groups and cationic groups; and those obtained by forming an anionic polymer and a cationic polymer into a mosaicked, ultrathin, planar film on a liquid-permeable support and then allowing the cationic and anionic polymers to epitaxially grow as layers on the same ionic polymers of the film, respectively.

Formation of a lamellar or cylindrical structure by making use of phase separation between two types of block copolymers, however, involves substantial difficulty from the technical viewpoint. Because of a limitation imposed on the mixing ratio of both the block copolymers and the anisotropy of both the structures, it is difficult to have the polymers of the different types stacked as alternate layers in a cross-section of the resultant membrane and also to communicate a front side of the membrane with a back side of the membrane via layers of each of the two types of the block copolymers. Moreover, a structure formed by such phase separation is anisotropic. This makes it difficult to form the lamellar or cylindrical structure with controlled directionality.

Subsequent to the formation of such a structure, cationic and anionic groups have to be introduced. This makes the production process complex. Further, a limitation is imposed on the quantities of these ionic groups to be reacted.

According to the epitaxial growth, the layer of the respective ionic polymers is allowed to grow on a mosaic pattern. Very strict control is therefore required upon formation of the mosaicked, ultrathin film and also upon formation of the respective polymer layers of the cationic and anionic polymers. This conventional process is therefore not suited for the production of a membrane of a large area.

Whichever conventional process is used, the resulting membrane is very thin and has low strength so that it is impossible to form a relatively thick membrane having high strength and excellent performance.

SUMMARY OF THE INVENTION

An object of the present invention is to provide a charge mosaic membrane which is useful for the separation of an electrolyte or non-electrolyte or for desalination.

Another object of the present invention is to provide a simpler process for the production of such a charge mosaic membrane.

In one aspect of the present invention, there is thus provided a charge mosaic membrane made of a cationic polymer and an anionic polymer. At least one of the cationic and anionic polymers is in the form of spheres having a diameter of 0.01–10 μm.

In another aspect of the present invention, there is also provided a process for the production of the above charge mosaic membrane. The process comprises immobilizing one of the cationic and anionic polymers on a liquid-permeable support, filling interstices between the spheres with a monomer adapted to form the other polymer, and polymerizing the monomer. As an alternative, the process comprises mixing spheres of one of the cationic and anionic polymers with a solution of a linear polymer as the other polymer, and casting the resultant mixture into a film. In a further alternative, the process comprises preparing dispersions of spheres of the cationic and anionic polymers, respectively, mixing the dispersions together, and casting the resultant mixture into a film. In a still further alternative, the process comprises casting a core-shell polymer into a film, said core-shell polymer being formed of spheres of one of the cationic and anionic polymers and a linear polymer chemically bound as the other polymer on surfaces of the spheres, and causing shells and cores to rupture. In a still further alternative, the process comprises preparing dispersions of spheres of the cationic and anionic polymers, respectively, mixing the dispersions together, casting the resultant mixture into a film, and filling interstices between the spheres with one of the cationic and anionic polymers or a monomer adapted to form one of the cationic and anionic polymers. When the monomer is used, the monomer is subsequently polymerized.

Since at least one of the cationic polymer and the anionic polymer in the charge mosaic membrane is in the form of spheres having a diameter of 0.01–10 μm, the charge mosaic membrane has been improved inter alia in the ability to selectively separate an electrolyte or non-electrolyte and also in mechanical strength. The production processes according to the present invention can provide the charge mosaic membrane at low cost.

Because of the use of spheres of at least one of the cationic and anionic polymers upon production of the charge mosaic membrane in the present invention, bonding of the spheres in the resulting membrane takes place in an isotropic manner. This has led to a significant improvement in the dialysis of an electrolyte through the membrane so formed. Since at least one of the cationic and anionic polymers, that is, the membrane-forming materials is in the form of spheres, it is no longer necessary to consider the directionality of the polymer phase upon production of the membrane. By the simple process, this invention can therefore provide a charge mosaic membrane useful for the separation of an electrolyte or non-electrolyte or for desalination.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
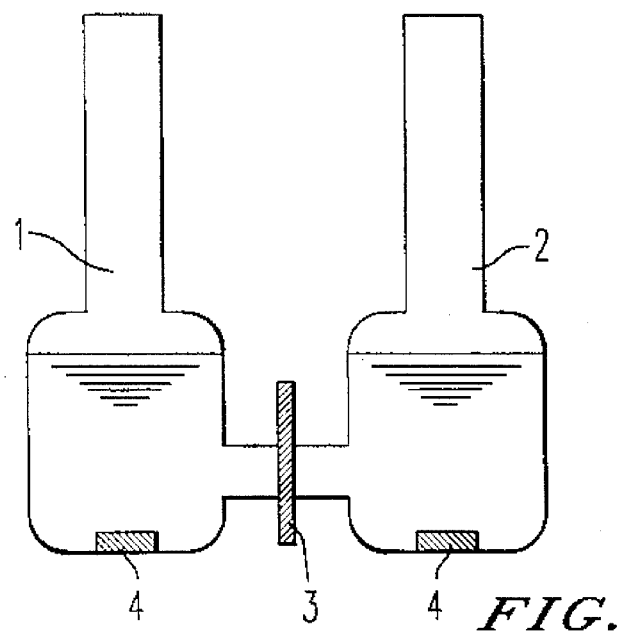
FIG. 1 is a schematic illustration of filtration and separation of an electrolyte and a non-electrolyte by a charge mosaic membrane according to the present invention.

The cationic polymer employed in the present invention is preferably a polymer containing primary, secondary or tertiary amino groups, quaternary ammonium groups, or salts thereof. The anionic polymer is preferably a polymer containing sulfonic groups, carboxylic groups or salts thereof. In the case of salt-forming groups, anions such as ions of hydrochloric acid, sulfuric acid, phosphoric acid or an organic acid can be used for cationic groups whereas cations such as alkali metal ions can be used for anionic groups.

Examples of the cationic polymer include polyvinylpyridine and quaternized products thereof; poly(2-hydroxy-3-methacryloyloxypropyltrimethylammonium chloride); poly(dimethylaminoethyl methacrylate), poly(diethylaminoethyl methacrylate), and salts thereof; copolymers of plural monomers forming the above-exemplified polymers; and copolymers of monomers forming the above-exemplified polymers with other monomers.

Illustrative of the anionic polymer include poly-(2-acryloylamino-2-methyl-1-propanesulfonic acid), poly(2-acryloylamino-2-propanesulfonic acid), polymethacryloyloxypropylsulfonic acid, polysulfopropyl methacrylate, poly(2-sulfoethyl methacrylate), polvinylsulfonic acid, polyacrylic acid, polystyrene-maleic acid copolymers, and salts thereof; copolymers of plural monomers forming the above-exemplified polymers; and copolymers of monomers forming the above-exemplified polymers with other monomers.

To form such a polymer into spheres, various known processes can be used including, for example, the process in which spheres are caused to deposit from a solution of the polymer as well as polymerization processes such as soap free polymerization, emulsion polymerization, suspension polymerization, reversed phase polymerization and seed polymerization.

It may be preferred to crosslink the polymer spheres in some instances. Exemplary crosslinking agents usable upon crosslinking them include divinylbenzene, methylenebisacrylamide, ethylene glycol dimethacrylate and 1,3-butylene glycol dimethacrylate as well as tri- or tetra-functional acrylates and methacrylates. These crosslinking agents can each be used in a proportion of 20 parts by weight or less, preferably 0.5–10 parts by weight, both per 100 parts of the monomer or monomers forming the polymer.

In the present invention, it is preferred to use the crosslinked spheres in combination with uncrosslinked spheres. The diameter of the spheres to be employed should be 0.01–10 μm, with 0.02–1 μm being preferred.

The charge mosaic membrane according to the present invention is formed using spheres of at least one of the cationic and anionic polymers. To reinforce the membrane to be formed, it is desired to use a suitable liquid-permeable support. Preferred examples of such a liquid-permeable support include porous bodies such as woven fabrics, nonwoven fabrics, porous resin sheets, sintered porous ceramic bodies, and metal meshes. These porous bodies may have a thickness in the range of 0.01–500 μm, preferably of 0.1–100 μm.

Whichever process of the present invention is used for the production of the charge mosaic membrane, it is essential to use at least one of the anionic polymer and the cationic polymer in the form of spheres. It is however not absolutely necessary to use the other polymer in the form of spheres.

The charge mosaic membrane of the present invention can be produced by one or a desired combination of the following processes:

(1) After spheres of one of the cationic and anionic polymers are immobilized on a liquid-permeable support, a monomer of the other polymer is filled in interstices between the spheres, followed by polymerization.

(2) Spheres of one of the cationic and anionic polymers are mixed with a solution of a linear polymer as the other polymer, and the resulting mixture is cast into a film. Incidentally, the term "linear polymer" as used herein is employed to distinguish the linear polymer from spheres. A polymer may therefore contain branch chains insofar as it is not in the form of spheres.

(3) Dispersions of spheres of the cationic and anionic polymers are prepared, respectively. These dispersions are then mixed and cast into a film.

(4) A linear polymer as one of the cationic and anionic polymers is chemically bound on surfaces of spheres of the other polymer to form a core-shell polymer. The core-shell polymer is then cast into a film. Shells and cores are then caused to rupture so that the cores are joined together.

(5) Dispersions of spheres of the cationic and anionic polymers are prepared, respectively. The dispersions are mixed together and cast into a film. Interstices between the spheres are filled with one of the cationic and anionic polymers or a monomer adapted to form one of the cationic and anionic polymers. When the monomer is used, the monomer is thereafter polymerized.

As the two types of polymer spheres employed above, it is preferable to combine crosslinked spheres with uncrosslinked spheres. After they are mixed together and cast into a film, the polymer spheres in the resulting film are caused to rupture or deform by a solvent, pressure or the like. This ensures successional bonding of spheres of the same ionic polymers, resulting in a film with improved mechanical strength.

The present invention will hereinafter be described more specifically by the following examples.

EXAMPLE 1

Charged in a flask were 500 ml of water, 3 ml of 4-vinylpyridine, 0.1 ml of divinylbenzene and 0.1 g of 2,2'-azobis(2-methyl-2-methylpropinoamidine) dihydrochloride. They were reacted at 80° C. for 5 hours under a nitrogen gas stream, whereby an emulsion-like reaction mixture was obtained.

The emulsion-like reaction mixture was then added with 3 g of sodium chloride, followed by stirring. The resulting mixture was then subjected to pressure filtration through a Millipore® filter (product of Millipore Corporation). A solid product so collected was washed with water and then dried, so that poly(4-vinylpyridine) was obtained in the form of spheres having a diameter of about 300 nm.

One gram of the polyvinylpyridine obtained above was dispersed at a concentration of 3 wt. % in methanol to prepare a dispersion, in which 0.2 g of methyl iodide and 0.2 g of chloromethylstyrene were added to achieve quaternization and also to introduce polymerizable groups. They were reacted at 30° C. for 40 hours, whereby the nitrogen atom in each pyridine ring was quaternized.

Next, a solution of a polystyrene-polybutadienepolystyrene block copolymer (polystyrene content: 40 wt. %) was coated on a glass plate and then dried to form a film of about 100 μm in thickness. A polyester-made, non-woven fabric having a basis weight of 40 g/m² and a thickness of 50 μm was fusion-bonded on the film so that the non-woven fabric was filled. One side of the non-woven fabric, said side having been unfilled, was impregnated with the dispersion of the spherical polymer obtained above. After the thus-impregnated non-woven fabric was left over until it was dried to certain extent, it was dried further at 60° C. for 12 hours.

Through the unfilled side, the non-woven fabric was impregnated further with a 10 wt. % aqueous solution of poly(sodium styrenesulfonate). After dried at 60° C., the non-woven fabric was washed with water and then dried again. The whole structure was placed in water, and the layer consisting of the non-woven fabric and the membrane was peeled off from the glass plate and the filling layer to obtain a charge mosaic membrane according to this invention. The total amount of the charged polymers in the membrane was 4.2 g/m².

The ability of the membrane to dialyze an electrolyte and a non-electrolyte therethrough was measured using the apparatus shown in FIG. 1. Placed in a vessel 1 were a 3 wt. % aqueous solution of sodium chloride as the electrolyte and a 0.01 mol/l aqueous solution of acrylamide as the non-electrolyte, each in an amount of 20 ml. Purified water (40 ml) was placed in a vessel 2. The above membrane of the present invention was arranged between those two vessels and the contents of the vessels 1,2 were maintained at 25° C. under stirring for 3 days. The concentrations of the electrolyte and non-electrolyte in each vessel were measured. As a result, 50 wt. % sodium chloride was found to have moved between both the vessels so that sodium chloride reached equilibrium at that concentration. On the other hand, only about 0.2 wt. % of acrylamide was found to have moved. Those results indicate that the charge mosaic membrane according to this invention has excellent property to selectively remove an electrolyte.

EXAMPLE 2

Mixed were 9.7 parts of a water dispersion of spheres of crosslinked poly(4-vinylpyridine) (solid content: 2.15 wt. %, diameter: about 200 nm), 9.7 parts of a water dispersion of spheres of uncrosslinked poly(4-vinylpyridine) (solid content: 2.34 wt. %, diameter: about 180 nm), an aqueous solution of an uncrosslinked copolymer of sodium styrenesulfonate and acrylamide at a molar ratio of 1:1 (solid content: 10 wt. %) and 7.4 parts of a 50 wt. % aqueous solution of glutaraldehyde. The mixture so prepared was cast into a film on a TEFLON® support and dried in the air.

The membrane so formed was left over for one day in a vaporized methanol atmosphere so that the spheres of the uncrosslinked poly(4-vinylpyridine) were formed into a film. The film so obtained was next left over for 1 day in a desiccator which contained 35 wt. % of hydrochloric acid. The film so treated was then washed with water, dried in the air, and treated in a diiodobutane/methanol atmosphere. The nitrogen atoms of 4-vinylpyridine were then quaternized completely in a vaporized methyl iodide/methanol atmosphere.

The charge mosaic membrane obtained as described above remained in a film-like form even without the liquid-permeable support. A dialysis test of the membrane was conducted using a 0.05 mol/l aqueous solution of glucose and a 0.05 mol/l aqueous solution of potassium chloride in the same apparatus as that employed in Example 1. The thickness of the membrane was about 150 μm, and its dialytic performance is diagrammatically illustrated in FIG. 2. As is clearly envisaged from the results shown in FIG. 2, the membrane according to the present invention showed good performance for the separation of the electrolyte and non-electrolyte from each other.

Figure 2:
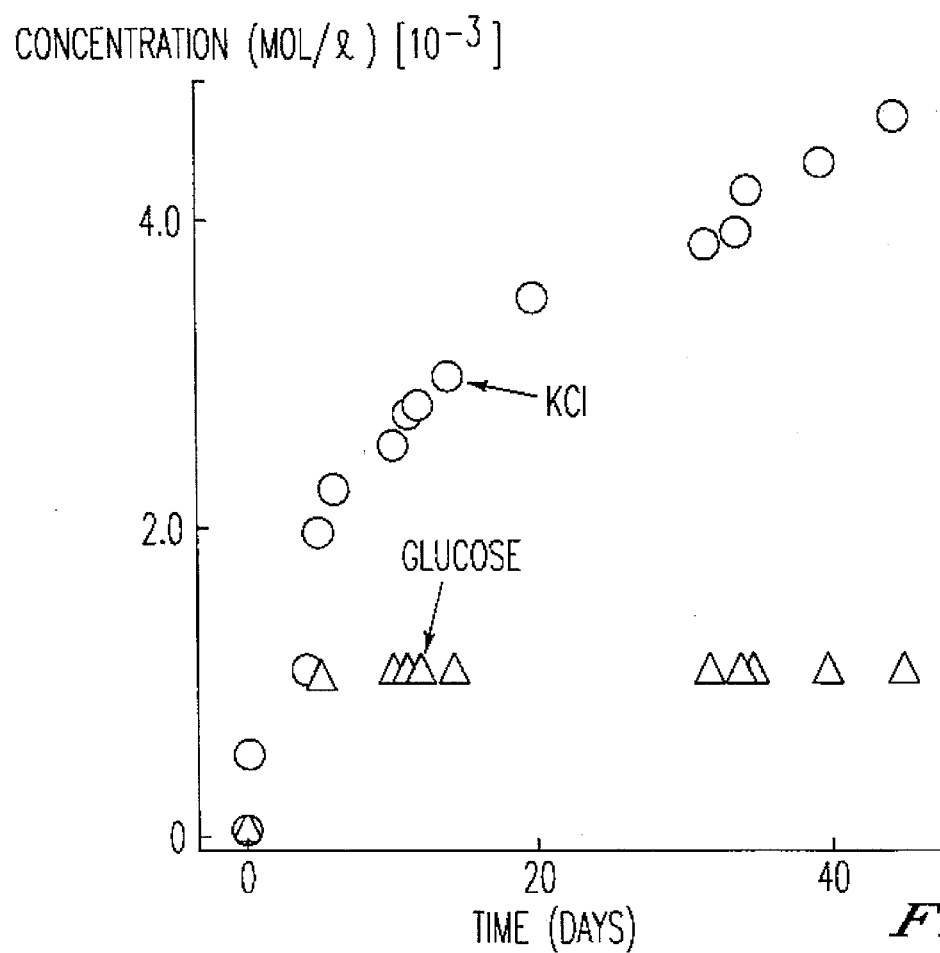
FIG. 2 is a diagrammatic representation illustrating the performance of a charge mosaic membrane, which was obtained in Example 2, when employed for the separation of an electrolyte and a non-electrolyte.

Incidentally, an extremely small amount of glucose was also dialyzed in FIG. 2. A measurement error appears to be responsible for the error. Anyhow, the electrolyte was efficiently dialyzed and substantially no non-electrolyte was dialyzed, so that the separation of the electrolyte and the non-electrolyte was performed sufficiently.

The dialysis experiment shown in FIG. 2 was conducted under atmospheric pressure so that a long time was needed for the dialysis of the electrolyte. The dialysis time can however be shortened significantly by forming the membrane thinner or applying a pressure.

EXAMPLE 3

A charge mosaic membrane was produced in a similar manner to Example 2 except that a half of the sodium styrenesulfonate in the uncrosslinked 1:1 (by molar ratio) copolymer of sodium styrenesulfonate and acrylamide in the aqueous solution was replaced by crosslinked spheres of sodium styrenesulfonate-styrene-acrylamide-divinylbenzene (molar ratio: 50/30/10/10) in an amount sufficient to make the total molar amount of sodium styrenesulfonate equal to that of the acrylamide.

The thickness of the membrane was about 200 μm and its dialytic performance was similar to that of the membrane of Example 2.

EXAMPLE 4

A. Preparation of poly(4-vinylpyridine) microgel

Ten parts of 4-vinylpyridine, 1 part of divinylbenzene, 0.2 part of 2,2'-azobis(2-methyl-2-methylpropinoamidine) dihydrochloride and 500 parts of water were placed in a 1-l flask, followed by polymerization at 70° C. for 7 hours in a nitrogen atmosphere.

The polymerization mixture so obtained was in the form of an emulsion-like liquid. The polymerization product was purified by dialysis. As an alternative, the polymerization product can be purified by first subjecting the polymerization mixture to pressure filtration and then washing with water the polymerization product so collected. After drying, the polymerization product was successfully redispersed in water and methanol, respectively. The particle size of the polymer spheres so obtained was about 150 nm when dried, about 200 nm when redispersed in water, and about 500 nm when redispersed in methanol.

B. Preparation of linear poly(sodium sulfonate)

Sodium styrene sulfonate (12 parts), 4 parts of acrylamide, 0.5 part of 2,2'-azobis(2-methyl-2-methylpropinoamidine) dihydrochloride, 0.8 part of diallyl malonate, 1 part of crotonaldehyde and 100 parts of water were placed in a flask and the reacted at 70° C. for 10 hours in a nitrogen atmosphere. The resulting polymer was purified by reprecipitation in acetone-water and then dried at room temperature. The molecular weight of the polymer so obtained was about 44,000 (gel permeation chromatography; GPC). The polymer contained an amidino group at one end.

C. Preparation of core-shell polymer

One part of the linear poly(sodium sulfonate) prepared above under B. was dissolved in 10 parts of water, in which 0.5 parts of sodium bicarbonate were dissolved. The solution so prepared was stirred for 5 hours. One part of epibromohydrin was added to the solution, followed by a reaction at 45° C. for 10 hours. The reaction mixture was purified by dialysis.

Bromine in the reaction product, i.e., the polymer so obtained was ionized with an alkali and quantitated. The molecular weight of the polymer was about 40,000 when one bromine atom was bonded to one end of the polymer. This finding is substantially consistent with the results by the GPC analysis. An aqueous solution of the polymer was prepared at a concentration of 5 wt. % in terms of solid. Forty parts of the solution were taken and then mixed with 10 parts of the 10 wt. % methanol solution of the poly(4-vinylpyridine) microgel described above under A. The resulting mixture was reacted at room temperature for 24 hours, and the reaction product was collected by filtration, washed with water and then dried under reduced pressure.

By quantitation of the aldehyde and observation by a transmission electron microscope (TEM), the linear polymer B was found to exist only on surfaces of spheres of the poly(4-vinylpyridine) and one backbone of the linear polymer B was found to exist per 10 pyridine units. If desired, the nitrogen atom of each pyridine ring can be completely quaternized with methyl iodide or the like.

In place of the poly(4-vinylpyridine) spheres in Example 2, the core-shell polymer obtained as described above was used. The core-shell polymer was mixed with an aqueous solution of the linear poly(sodium sulfonate) in an amount corresponding to sulfonic acid which was equivalent to the poly(4-vinylpyridine) in the core-shell polymer. The resulting mixture was cast into a film and, after having been treated as in Example 2, the resulting membrane was spread over a porous stainless steel support and press-bonded under a pressure of 200 kg/cm$^2$. The charge mosaic membrane obtained as described above showed still better desalting effect when an aqueous solution of salt, as a solution to be dialyzed, was pressurized.

What is claimed is:

1. A charge mosaic membrane formed of a cationic polymer and an anionic polymer wherein at least one of the cationic and anionic polymers is in the form of spheres having a diameter of 0.01 to 10 μm, prepared by a process comprising:

preparing dispersions of spheres of the cationic and anionic polymers respectively;

mixing the dispersions together; and casting the resultant mixture into a film.

2. A charge mosaic membrane formed of a cationic polymer and an anionic polymer wherein at least one of the cationic and anionic polymers is in the form of spheres having a diameter of 0.01 to 10 μm, prepared by a process comprising;

preparing dispersions of spheres of cationic and anionic polymers, respectively;

mixing the dispersions together;

casting the resultant mixture into a film; and filling interstices between the spheres with one of the cationic and anionic polymers.

3. A charge mosaic membrane formed of a cationic polymer and an anionic polymer wherein at least one of the cationic and anionic polymers is in the form of spheres having a diameter of 0.01 to 10 μm, prepared by a process comprising:

preparing dispersions of spheres of the cationic and anionic polymers, respectively;

mixing the dispersions together;

casting the resultant mixture into a film;

filling interstices between the spheres with a monomer adapted to form one of the cationic and anionic polymers; and polymerizing the monomer.

4. A charge mosaic membrane formed of a cationic polymer and an anionic polymer wherein at least one of the cationic and anionic polymers is in the form of spheres having a diameter of 0.01 to 10 μm, prepared by a process comprising:

preparing a core-shell polymer structure by chemically binding a linear cationic or anionic polymer on the surfaces of spheres of the oppositely charged polymer;

casting the core-shell polymer into a film; and then causing the shells and cores of the polymer to rupture thereby joining the cores together.

5. The charge mosaic membrane as claimed in any one of claims 1, 2, 3 and 4, wherein one of the cationic and anionic polymers is in the form of spheres immobilized on a liquid-permeable support and the interstices between the spheres of the polymer are filled with the other polymer.

6. The charge mosaic membrane as claimed in any one of claims 1, 2, 3 and 4, wherein one of the cationic and anionic polymers is in the form of spheres and the other polymer is present as an uncross-linked polymer.

7. The charge mosaic membrane as claimed in any one of claims 1, 2, 3 and 4, wherein the cationic and anionic polymers are each in the form of spheres.

8. The charge mosaic membrane according to any one of claims 1, 2, 3 and 4, wherein said cationic polymer is quaternized polyvinylpyridine, salts of poly(2-hydroxy-3-methacryloyloxypropyltrimethylammonium chloride, poly(dimethylaminoethyl methacrylate or poly(diethylaminoethyl methacrylate), copolymers of several of the monomers of these polymers or copolymers of the charged monomers with other monomers.

* * * * *